United States Patent
Basir et al.

(10) Patent No.: US 9,581,615 B2
(45) Date of Patent: Feb. 28, 2017

(54) METHOD OF CORRECTING THE ORIENTATION OF A FREELY INSTALLED ACCELEROMETER IN A VEHICLE

(71) Applicant: Intelligent Mechatronic Systems Inc., Waterloo (CA)

(72) Inventors: Otman A. Basir, Waterloo (CA); Seyed Hamidreza Jamali, Waterloo (CA); William Ben Miners, Guelph (CA); Jason Toonstra, Elmira (CA)

(73) Assignee: NTELLIGENT MECHATRONIC SYSTEMS INC., Waterloo (CA)

(*) Notice: Subject to any disclaimer, the term of this patent is extended or adjusted under 35 U.S.C. 154(b) by 136 days.

(21) Appl. No.: 13/632,554

(22) Filed: Oct. 1, 2012

(65) Prior Publication Data
US 2013/0081442 A1 Apr. 4, 2013

Related U.S. Application Data
(60) Provisional application No. 61/541,786, filed on Sep. 30, 2011.

(51) Int. Cl.
*G01P 21/00* (2006.01)
(52) U.S. Cl.
CPC ................ *G01P 21/00* (2013.01)
(58) Field of Classification Search
CPC ........................................ G01P 21/00
USPC .......... 73/493, 510, 1.38, 488; 340/438–439, 340/425.5; 701/31.4, 70
See application file for complete search history.

(56) References Cited

U.S. PATENT DOCUMENTS

| | | | | |
|---|---|---|---|---|
| 5,986,583 A * | 11/1999 | Nakano et al. | | 340/988 |
| 6,466,887 B1 * | 10/2002 | Weinbrenner | | 702/141 |
| 6,532,419 B1 * | 3/2003 | Begin et al. | | 701/504 |
| 6,729,176 B2 * | 5/2004 | Begin | | 73/1.38 |
| 6,911,905 B2 | 6/2005 | Carlson et al. | | |
| 8,370,103 B2 * | 2/2013 | Cho et al. | | 702/141 |
| 8,887,566 B1 * | 11/2014 | Tanenhaus | | G01C 21/165 702/145 |
| 2003/0109258 A1 * | 6/2003 | Mantyjarvi et al. | | 455/440 |
| 2004/0178088 A1 * | 9/2004 | Zonker et al. | | 206/242 |
| 2004/0245849 A1 * | 12/2004 | Kissel | | 303/7 |
| 2005/0137799 A1 * | 6/2005 | Alban et al. | | 701/213 |
| 2005/0253806 A1 * | 11/2005 | Liberty | | G06F 1/3215 345/156 |
| 2006/0095189 A1 * | 5/2006 | Kissel | | 701/70 |
| 2006/0260397 A1 * | 11/2006 | Kim et al. | | 73/488 |
| 2007/0250243 A1 * | 10/2007 | Braunberger et al. | | 701/70 |

(Continued)

OTHER PUBLICATIONS

International Search Report for PCT Application No. PCT/US2012/058311, Nov. 28, 2012.

*Primary Examiner* — Helen Kwok
(74) *Attorney, Agent, or Firm* — Carlson, Gaskey & Olds, P.C.

(57) ABSTRACT

A vehicle monitoring system includes an accelerometer installed in the vehicle in an unknown orientation. The system infers the orientation of the accelerometer in the vehicle from the acceleration signals. The proposed method detects and corrects the orientation in two steps. In the first step, the gravity vector is used to estimate the orientation in the vertical plane. Then, based on the acceleration data collected during the vehicle movement, the heading of the vehicle is estimated and the orientation within the horizontal plane is corrected.

11 Claims, 11 Drawing Sheets

Four different accelerometer orientations.

(56) References Cited

U.S. PATENT DOCUMENTS

| | | | |
|---|---|---|---|
| 2008/0255722 A1 | 10/2008 | McClellan et al. | |
| 2008/0300731 A1* | 12/2008 | Nakajima et al. | 701/1 |
| 2008/0309156 A1* | 12/2008 | Kissel | 303/20 |
| 2009/0045984 A1* | 2/2009 | Tunnell et al. | 340/988 |
| 2009/0051510 A1 | 2/2009 | Follmer et al. | |
| 2010/0145576 A1* | 6/2010 | Doi | 701/41 |
| 2010/0191408 A1* | 7/2010 | Boylston et al. | 701/29 |
| 2010/0256857 A1* | 10/2010 | Lee et al. | 701/29 |
| 2010/0265800 A1* | 10/2010 | Eatwell | G01S 5/186 367/127 |
| 2010/0318255 A1* | 12/2010 | Li et al. | 701/29 |
| 2011/0054834 A1* | 3/2011 | Partridge | G01C 17/28 702/150 |
| 2011/0082642 A1* | 4/2011 | Magnussen | 701/208 |
| 2011/0125404 A1* | 5/2011 | Czompo | 701/216 |
| 2011/0208444 A1* | 8/2011 | Solinsky | A61B 5/112 702/41 |
| 2011/0282620 A1* | 11/2011 | Sakuraoka | 702/141 |
| 2012/0041702 A1* | 2/2012 | Toda et al. | 702/94 |
| 2012/0176492 A1* | 7/2012 | Garin | 348/116 |
| 2012/0254809 A1* | 10/2012 | Yang | G06F 3/038 715/863 |

\* cited by examiner

Figure 1

Figure 2. Relevant coordinate systems.

Figure 3. Accelerometer transformed coordinate system after applying $R_\varphi^x$ and $R_\theta^y$ rotations.

Figure 4. Data points used for heading estimation;
  (a) x-y components of the horizontal acceleration after correcting the vertical orientation,
  (b) expurgated x-y components of the horizontal acceleration used for PCA,
  (c) expurgated x-y components of the horizontal acceleration used for resolving phase ambiguity.

Figure 5: An example of acceleration data
  (a) Accelerometer data before slope compensation,
  (b) Accelerometer data after slope compensation.

Figure 6. Flow chart of the Accelerometer Orientation Correction (AOC) algorithm.

Figure 7. Four different accelerometer orientations.

Figure 8: Relevant coordinate systems.

Figure 9: Accelerometer transformed coordinate system after applying $\mathbf{R}^x_\varphi$ and $\mathbf{R}^y_\theta$ rotations.

Figure 10: Linear interpolation of speed samples.

Figure 11: Flow chart of the algorithm.

Figure 12: Flow chart of the heading estimation part.

METHOD OF CORRECTING THE ORIENTATION OF A FREELY INSTALLED ACCELEROMETER IN A VEHICLE

BACKGROUND

Acceleration data is seen as a key reporting element for insurance companies. For those applications that the accelerometer is installed freely in different vehicles, a reliable algorithm is required to automatically calibrate and normalize the accelerometer values in order to have accurate longitudinal and lateral accelerations regardless of device orientation within the vehicle. The device is often self-installed by the user in an unknown orientation relative to the vehicle. This algorithm is to require no human intervention to perform calibration.

Much of the related previous work has focused on estimation of the accelerometer orientation for body-worn devices. In one, the gravity vector is used to estimate the vertical component and the magnitude of the horizontal component of the user's motion for a free oriented 3-axis accelerometer system. This method estimates the magnitude of the horizontal component and fails to determine its orientation. Another extends the work to estimate orientation of a 3-axis accelerometer within the horizontal plane for the users who carry such devices. Limiting the user to walk forward in a fairly straight direction, it applies the Principal Component Analysis (PCA) to infer the orientation in horizontal plane.

SUMMARY

The system disclosed herein properly associates the measured accelerations from a self-installed device, having a 3-axis accelerometer, to the lateral and longitudinal accelerations of the vehicle without requiring the user intervention. The algorithm detects and corrects the orientation of the accelerometer in two steps. Based on the gravity vector, the algorithm transforms the orientation of the accelerometer to the coordinates of the vehicle in step one. Although the vertical component is accurately corrected in this step, however, there remains an ambiguity in the direction of the horizontal components. In order to find the lateral and longitudinal components of the horizontal component, the algorithm further proceeds to step two. In this step, using PCA, the algorithm adaptively and dynamically estimates the heading of the vehicle and extracts the lateral and longitudinal accelerations, accordingly.

The estimation and correction of the accelerometer orientation are performed in two steps. The step one is performed based on stationary data (when the vehicle is standing still). In this step the vertical orientation of the device is inferred with respect to the vehicle's body (body-frame) and the vertical orientation of the accelerometer is corrected in such a way that the z-component of the accelerometer coincides with the vertical component of the body-frame. The horizontal orientation angle is then estimated adaptively in the second step when the vehicle moves forward. The lateral and longitudinal accelerations are then extracted accordingly. This step may continue during different trips. In the following each step is described in more details.

In the embodiment disclosed herein, the gravity vector is determined using a sliding time window. The wheel angle is estimated using accelerometer values. Iterative refinement compensates for road, model, and sensor noise. Reliable estimation of heading is provided without the need for GPS or positional sensors.

DETAILED DESCRIPTION

Figure 1:
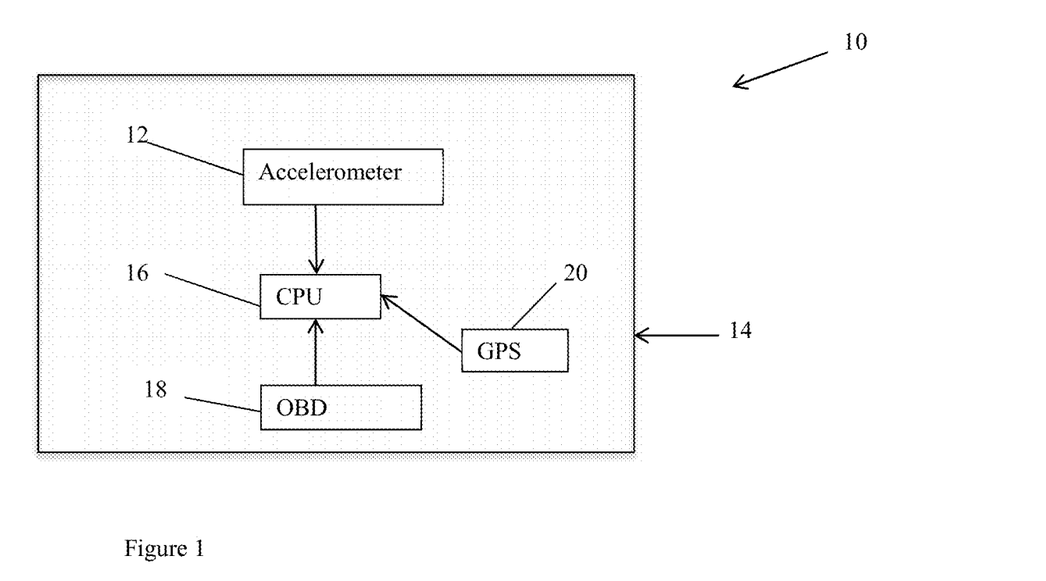
FIG. 1 is a schematic of a vehicle monitoring system according to one embodiment.

A vehicle monitoring system 10 is shown schematically in FIG. 1. The system 10 includes a three-axis accelerometer 12 installed in an unknown orientation in a vehicle 14. The accelerometer 12 sends its acceleration measurements to a CPU 16 (or controller). The CPU 16 includes appropriate storage, such as memory and other necessary hardware, and is appropriately programmed to perform the functions described herein. The CPU 16 may also receive speed data from the vehicle 14, such as from the vehicle's on-board diagnostics port (OBD) 18 (such as OBD-II or other vehicle bus or the like) or from GPS receiver 20.

Step One: Vertical Orientation Correction

As the accelerometers measure gravitational (static) acceleration as well as dynamic accelerations caused by the vehicle motion, we may use the gravity vector to align the accelerometer vertical axis with that of the vehicle (body-frame). The pull of gravity downward along some accelerometer axis manifests itself in the accelerometer output as acceleration in the opposite direction along the same axis.

Figure 2:
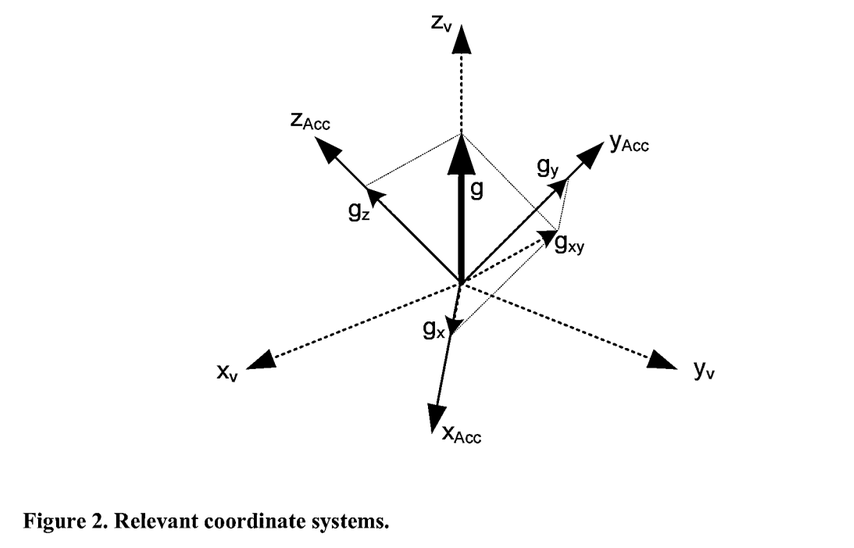
FIG. 2 illustrates the relevant coordinate systems of the accelerometer and vehicle of FIG. 1.

There are two relevant coordinate systems, as shown in FIG. 2. The 3-axis accelerometer configuration is in some arbitrary orientation on the vehicle's body. The three accelerometer axes are denoted in the figure as $x_{Acc}$, $y_{Acc}$, and $z_{Acc}$. Ideally, we would like to know acceleration information in terms of a coordinate system oriented to the vehicle and its forward direction. In the figure these axes are denoted $x_v$, $y_v$, and $z_v$ and it is assumed that the vehicle is parked on a flat surface and hence the gravity vector coincides with its vertical axis. In general, the coordinates of the accelerometer can be transformed to those of the vehicle by applying three rotations. In other words, the accelerations transformed to the vehicle coordinates can be written as $$\underline{a}_v = R \cdot \underline{a}_{Acc}^T \quad (1)$$

where $$R = R_\psi^z \cdot R_\theta^y \cdot R_\phi^x \quad (2)$$

and $$R_\varphi^x = \begin{bmatrix} 1 & 0 & 0 \\ 0 & \cos(\varphi) & -\sin(\varphi) \\ 0 & \sin(\varphi) & \cos(\varphi) \end{bmatrix} \quad (3a)$$

$$R_\theta^y = \begin{bmatrix} \cos(\theta) & 0 & -\sin(\theta) \\ 0 & 1 & 0 \\ \sin(\theta) & 0 & \cos(\theta) \end{bmatrix} \quad (3b)$$

$$R_\psi^z = \begin{bmatrix} \cos(\psi) & -\sin(\psi) & 0 \\ \sin(\psi) & \cos(\varphi) & 0 \\ 0 & 0 & 1 \end{bmatrix} \quad (3c)$$

The rotation values $\theta$ and $\phi$ (vertical orientation angles) can be calculated by measuring gravity vector components on each axis of the accelerometer as;

$$\varphi = \tan^{-1}\left(\frac{g_y}{g_z}\right) \quad (4)$$

$$\theta = \tan^{-1}\left(\frac{g_x}{\sqrt{g_y^2 + g_z^2}}\right)$$

and $\psi$ is the horizontal orientation angle that should be estimated by some means.

The algorithm in step one works as follows: based on stationary data (when the vehicle is standing still), an estimate of the gravity component on each axis is obtained by averaging all the readings on that axis. The rotation angles $\theta$ and $\phi$ are then calculated using (4).

We then calculate the dynamic component of the acceleration by removing the gravity vector. The dynamic component of the acceleration shows the motion rather than gravity. Applying the rotation matrices $R_\phi^x$ and $R_\theta^y$ on the dynamic components of acceleration will transform the accelerometer coordinate into a new coordinate system aligning its z-axis with the z-axis of the vehicle (see FIG. 3).

Step Two: Horizontal Orientation Correction

Figure 3:
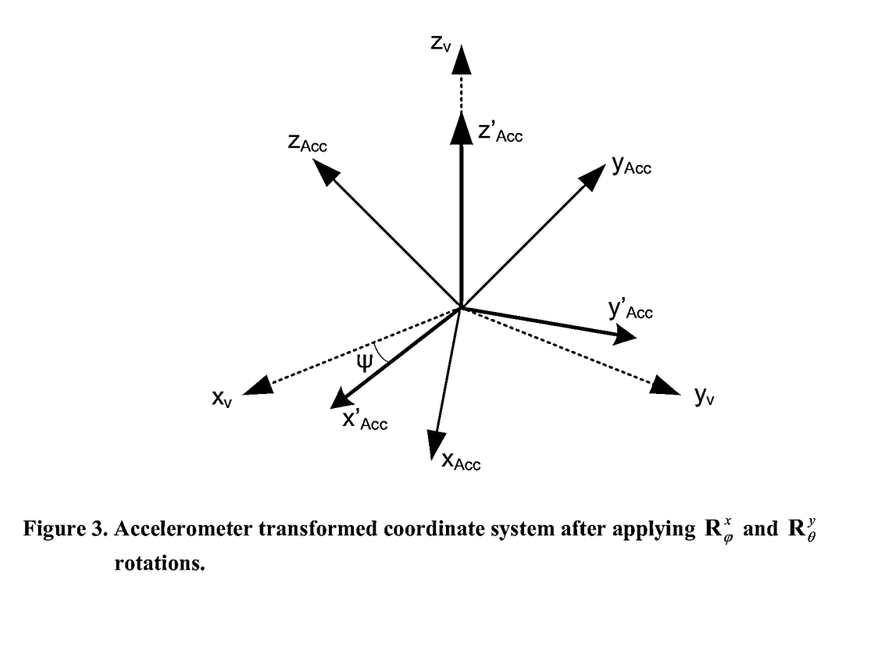
FIG. 3 illustrates the accelerometer transformed coordinate system after applying $R_\phi^x$ and $R_\theta^y$ rotations.

As shown in FIG. 3 to report the lateral and longitudinal accelerations for the vehicle we need to align the x-axis of the transformed accelerations ($x'_{Acc}$) with the forward direction of the vehicle ($x_v$). To this end, the angle $\psi$ should be estimated. To estimate this angle we use the fact that when the vehicle travels in a straight direction (without any turn or lane change) the resultant of the x and y components of the accelerometer coincide with the forward direction (heading) of the vehicle and the angle between each of x and y components and the heading of the vehicle remains constant. This fact is utilized in the second step of the algorithm to estimate and compensate the angle $\psi$.

To estimate $\psi$ the angle between the resultant of the x and y components of the accelerometer (heading) and the x component is monitored during the trip. Those values of x and y for which the heading is almost constant are recorded. The Principal Component Analysis (PCA) method is then applied on the recorded data points to estimate the angle $\psi$. PCA is a mathematical procedure that uses an orthogonal transformation to convert a set of possibly correlated variables into a set of values of uncorrelated variables called principal components.

In order to have accurate heading angle estimation, we first expurgate the accelerometer data after vertical orientation correction. The expurgation of the data is done as follows: the angle between the resultant of the x and y components of the accelerometer and the x component is monitored during the trip. The angle change is then calculated. The subset of x-y data for which this angle change is less than a preset threshold is chosen as the expurgated x-y data. The PCA is then applied on the expurgated data to estimate the heading angle $\psi$.

Figure 4A:
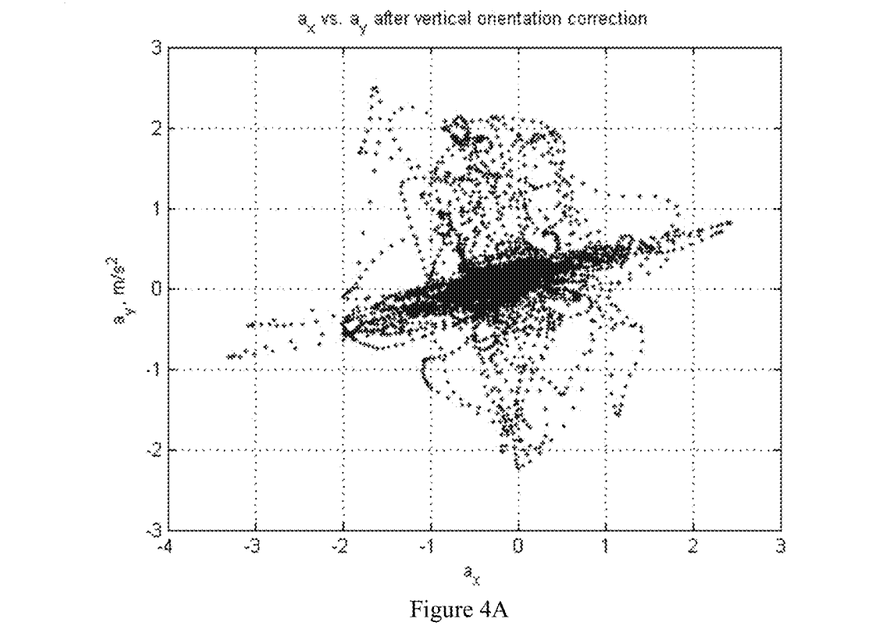
FIG. 4 shows graphs of exemplary data points used for heading estimation;
(a) x-y components of the horizontal acceleration after correcting the vertical orientation,
(b) expurgated x-y components of the horizontal acceleration used for PCA,
(c) expurgated x-y components of the horizontal acceleration used for resolving phase ambiguity.
Figure 4B:
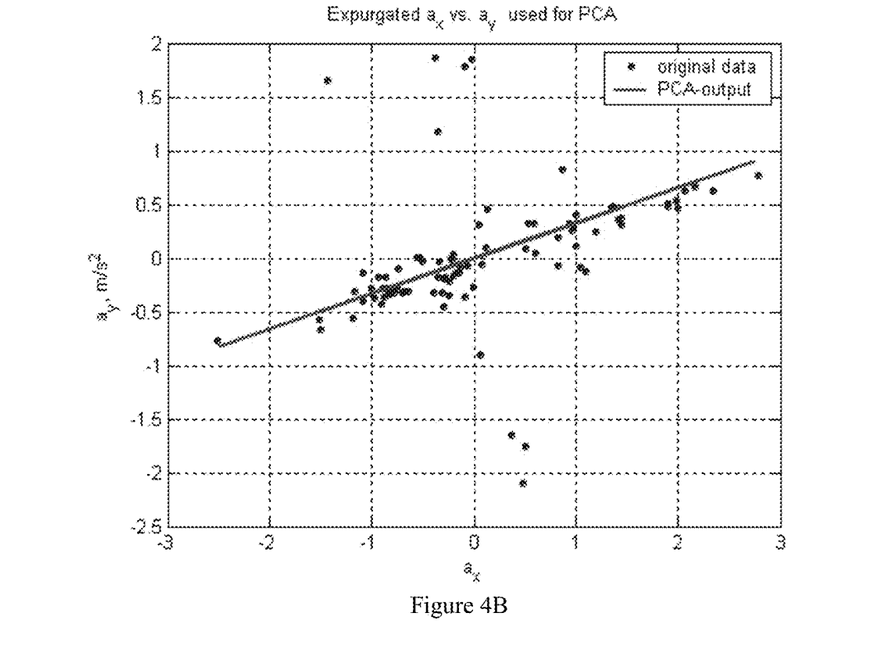
Figure 4C:
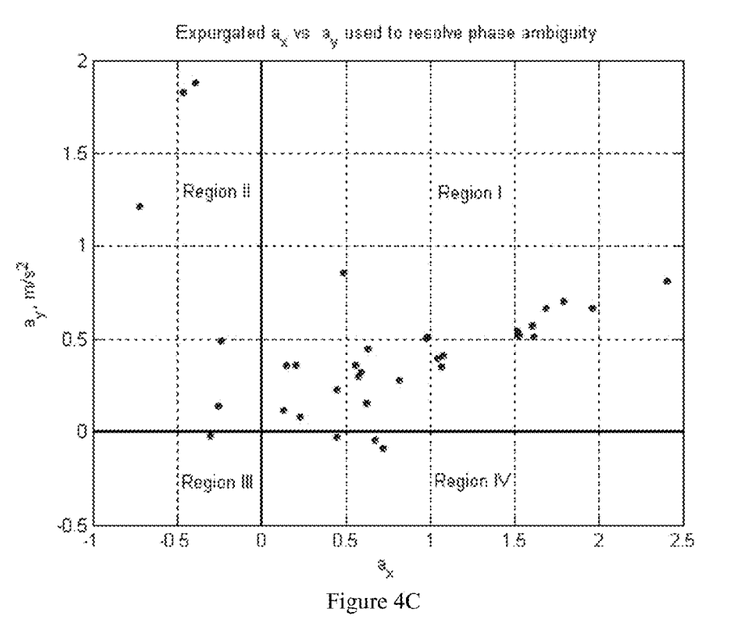

To visualize this process, x and y data points and the estimated angle $\psi$ are shown in FIG. 4. FIG. 4A shows the x and y components of the horizontal acceleration during a trip, and FIG. 4B represents those points (expurgated data) for which the change in the vehicle heading is not considerable. The red line in FIG. 4B depicts the direction of the heading of the vehicle (first principal component). For such a case the estimated $\psi$ is about 18° (or 198°).

As it is observed, this method may result in a 180° ambiguity in the heading estimation. This is evident from FIG. 4B in which the orientation of the first principal component can be estimated as either 18° or 198°. This is due to the fact that the x and y components used to determine the heading include both acceleration and deceleration data. This ambiguity can be resolved by confining the set of x and y components to the acceleration periods for which the gradient of the vehicle speed is positive. This set of data is used to determine in which one of the four quadrant regions, i.e., (x≥0, y≥0), (x<0, y≥0), (x<0, y<0), and (x≥0, y<0) the recorded data falls mostly (see FIG. 4C). The vehicle's speed is provided by either GPS receiver 20 or OBD 18 system.

Using the estimated $\psi$ and (3c) the final coordinate transformation is applied to align the forward direction of the vehicle with that of the accelerometer.

Implementation

The AOC algorithm can be implemented by the following steps.

A. Data Pre-Processing

Prior to applying the AOC algorithm the accelerometer and speed data should be aligned in time. They should have the same start and end times. There may exist a blank acceleration or speed data field in the trip data. These blank fields should be filled with proper values, estimated from the previous samples.

B. Slope Compensation

Figure 5A:
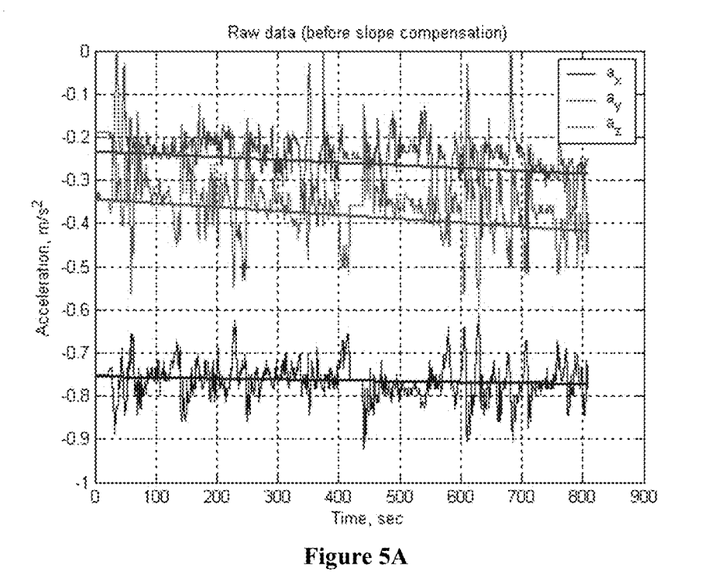
FIG. 5 shows graphs of an example of acceleration data
(a) Accelerometer data before slope compensation,
(b) Accelerometer data after slope compensation.
Figure 5B:
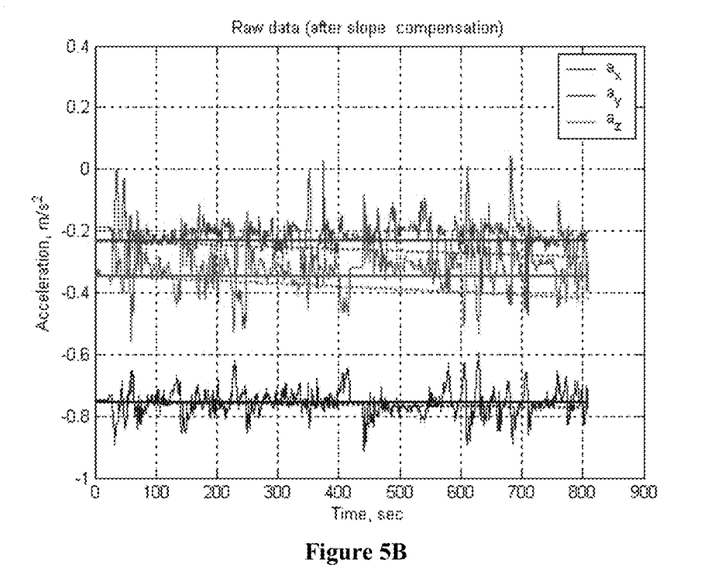

The slope of the accelerometer data may deviate from the horizontal line during a trip due to drift. This slope change should be compensated by the CPU 16. The CPU 16 uses linear regression technique to find the slope of the accelerometer data and compensates it. FIGS. 5A and 5B depict the accelerometer data before and after slope compensation.

C. Vertical Orientation Correction

To find the rotation angles, required for vertical orientation correction, the acceleration data should be collected when the vehicle is not moving (stationary, which could be determined by the data from the OBD 18 indicating zero speed). Due to the lack of this data for some trips, another approach is considered. The mean values of the x, y, and z components of the acceleration data (for the whole trip) or the first point of the linear regression line can be used to find the rotation angles θ and φ.

The vertical rotation angles θ and φ are then used to correct the vertical orientation.

D. Scaling the Accelerometer Data

When the vehicle is not moving the accelerometer only measures the gravity vector. The magnitude of this vector is g=9.81 m/s² (acceleration due to gravity at the earth surface). This can be used to calibrate the scaling factor of the accelerometer. As mentioned before, as for some trips the stationary data may not be available, we use the mean values as stationary data to calibrate the accelerometer data.

E. Horizontal Orientation Correction

The heading angle is estimated using PCA technique. This technique is applied to a subset of x-y acceleration data (expurgated data set) for which the heading change does not exceed a preset value (HC_thresh). The experimental results show that applying a threshold on the acceleration magnitude (acc_thresh_u) of the expurgated data set will further improve the performance. Hence, the expurgated data set for heading angle estimation is defined as $$\text{Exp\_Data}|_{Heading\ est} = \{(a_x, a_y) | |\text{heading change}| \leq HC\_thresh \ \&(a^2_x + a^2_x) \leq acc\_thresh\_u\}$$

The cardinality of this set (number of points) is shown as LL. To resolve the phase ambiguity this expurgated data set is further cleaned up by putting a constraint on the corresponding speed change. This expurgated data set is defined as $$\text{Exp\_Data}|_{Phase\ amb} = \{(aa_x, aa_y) | (aa_x, aa_y) \in \text{Exp\_Data}|_{Heading\ est} \& dV_{ss}/dt > 0\}$$

The cardinality of this set (number of points) is shown as LLL.

F. Horizontal Orientation Estimation Reliability

If there were no noise, it would have been enough to estimate the angle ψ once and apply it for the rest of the trips. However, the accelerometer noise and the noise due to road roughness cause a noisy estimate of ψ, which in some cases may result in a false orientation correction. To alleviate this issue, the following steps are required to ensure that the angle ψ is estimated with a high accuracy.

1—Some measures are used to indicate the reliability of the horizontal angle estimation. These reliability measure are defined as
   a. EVR: This is the ratio of the principal component eigen value to the eigen value of the other component. The larger EVR the more reliable estimation is likely to be.
   b. LL: The size of the expurgated data set used for PCA.
   c. LLL: The size of the expurgated data set used for resolving the phase ambiguity.

2—The reliable heading angle estimation for a trip will be saved and used to calculate the average reliable estimation during different trips. This average reliable estimation is used to correct the horizontal orientation.

3—If for a trip no reliable estimation exists, the previous saved average reliable estimation will be used.

G. Flow Chart

Figure 6:
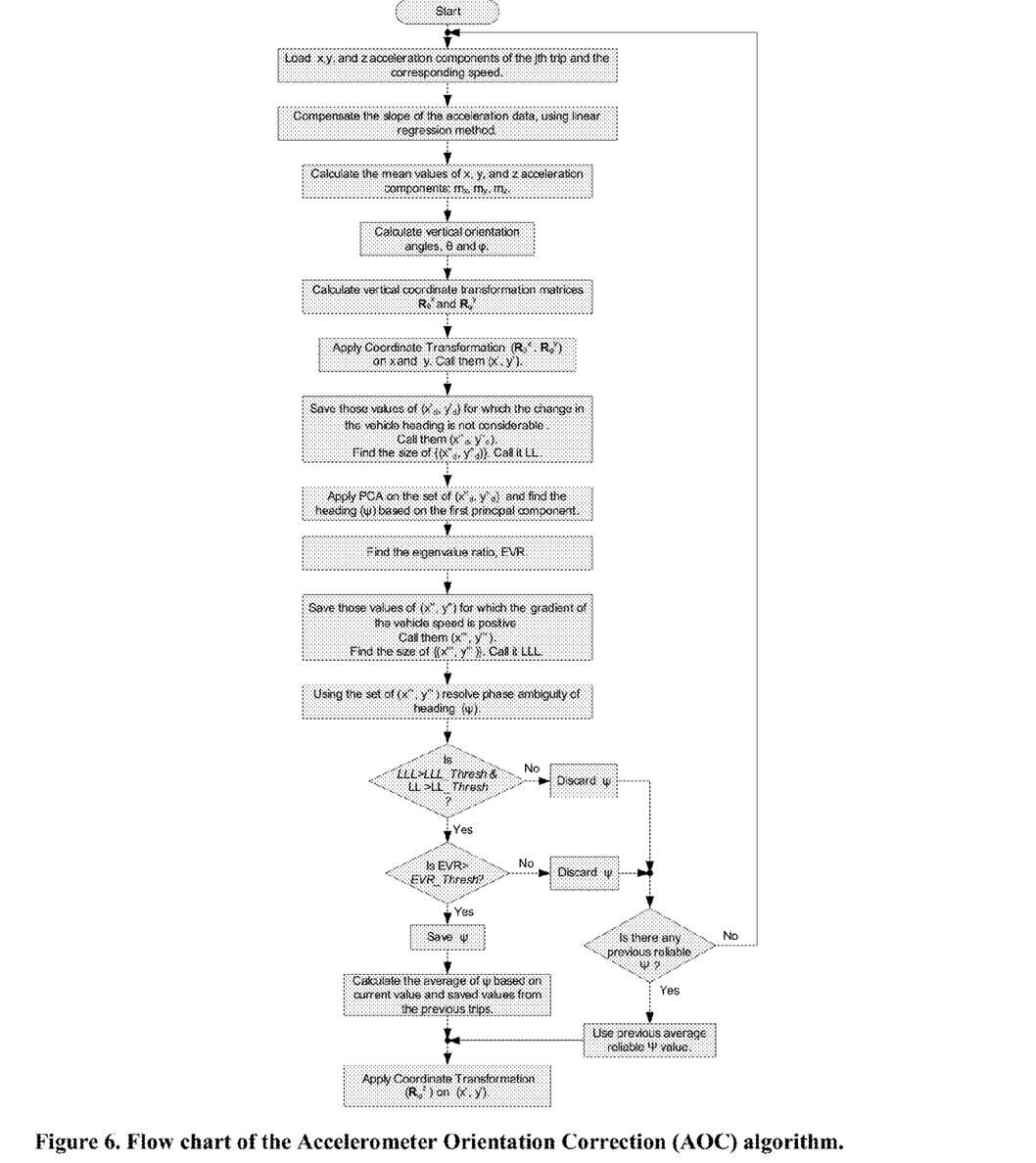
FIG. 6 is a flow chart of the Accelerometer Orientation Correction (AOC) algorithm.
Figure 7:
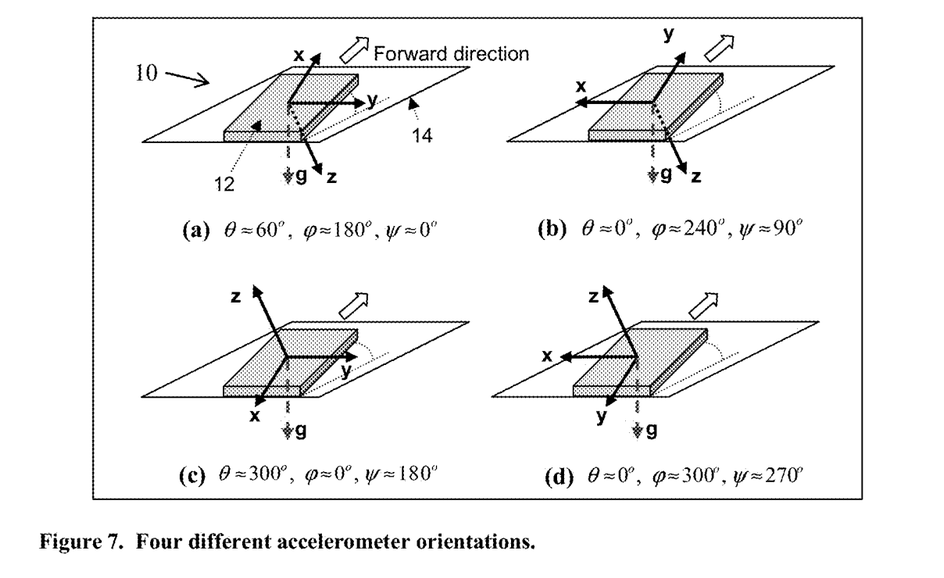
FIG. 7 illustrates four different exemplary, possible accelerometer orientations, which could be used with the AOC algorithm.

The flow chart of the Accelerometer Orientation Correction (AOC) algorithm is shown in FIG. 6.

The AOC algorithm corrects the vertical component based on its static calibration during the part of the trip when the vehicle is stationary. It is obvious that when the vehicle travels in different roads, this initial vertical calibration is violated slightly due to the road grade. This may have a slight effect on the reported lateral and longitudinal accelerations. This issue can be alleviated by recalibration of the vertical components during the moments where the vehicle is stopped for a while. However, this may involve a higher effort and complexity for less return. The reason is that even if the static recalibration is performed occasionally it may not be effective all the time due to the changes in the road grade.

Realtime Algorithm

The system 10 of FIG. 1 can also use an algorithm that estimates the orientation angles in real time with a very low processing delay. Similar to the offline algorithm, the estimation is done in two separate but concatenated steps. In step one, the vertical orientation angles are estimated based on the gravity vector and the accelerometer data is virtually reoriented vertically. In the second step, the horizontal angle (heading) is estimated from the vertically oriented accelerations and then applied to the accelerometer 12 data to correct the horizontal orientation as well.

The estimation and correction of the accelerometer orientation are performed in two steps. The step one is performed based on the gravity vector, extracted from the accelerometer 12 data. In this step the vertical orientation of the accelerometer 12 is inferred with respect to the vehicle's body and the orientation of the accelerometer is corrected in such a way that the z-component of the accelerometer coincide with the vertical component of the vehicle 14. The heading of the vehicle 14 is estimated adaptively in the second step when it moves forward. The lateral and longitudinal accelerations are then extracted accordingly. In the following each step is described in more details.

Step One: Vertical Orientation Correction

As the accelerometers 12 measure gravitational (static) acceleration as well as dynamic accelerations caused by the vehicle 14 motion, we may use the gravity vector to align the accelerometer vertical axis with that of the vehicle 14. The pull of gravity downward along some accelerometer axis manifests itself in the accelerometer 12 output as acceleration in the opposite direction along the same axis.

Vertical Angles Estimation

Figure 8:
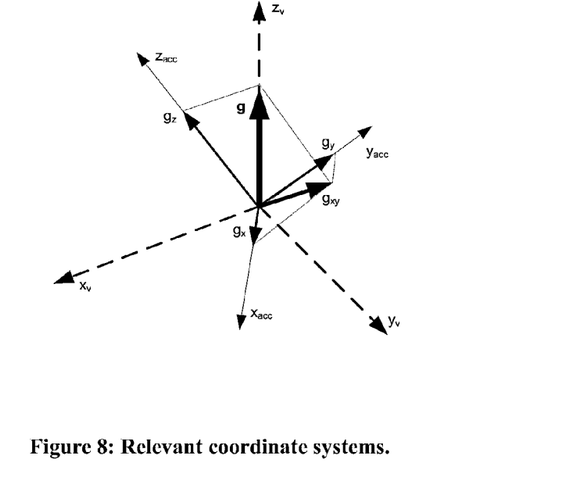
FIG. 8 illustrates the relevant coordinate systems for an algorithm according to a second embodiment that could be used with the system of FIG. 1.

There are two relevant coordinate systems, as shown in FIG. 8. The 3-axis accelerometer configuration is in some arbitrary orientation on the vehicle's body. The three accelerometer axes are denoted in figure as $x_{acc}$, $y_{acc}$, and $z_{acc}$. Ideally, we would like to know acceleration information in terms of a coordinate system oriented to the vehicle and its forward direction. In the figure these axes are denoted $x_v$, $y_v$, and $z_v$.

In general, the coordinates of the accelerometer can be transformed to those of the vehicle by applying three rotations. In other words, the accelerations transformed to the vehicle coordinates can be written as $$\underline{a}_v = R \cdot \underline{a}_{Acc}^T \tag{5}$$

where $$R = R_\psi^z \cdot R_\theta^y \cdot R_\phi^x \tag{6}$$

and $$R_\varphi^x = \begin{bmatrix} 1 & 0 & 0 \\ 0 & \cos(\varphi) & -\sin(\varphi) \\ 0 & \sin(\varphi) & \cos(\varphi) \end{bmatrix} \tag{7 a}$$

-continued $$R_\theta^y = \begin{bmatrix} \cos(\theta) & 0 & -\sin(\theta) \\ 0 & 1 & 0 \\ \sin(\theta) & 0 & \cos(\theta) \end{bmatrix} \quad (7\,b)$$

$$R_\psi^z = \begin{bmatrix} \cos(\psi) & \sin(\psi) & 0 \\ -\sin(\psi) & \cos(\varphi) & 0 \\ 0 & 0 & 1 \end{bmatrix} \quad (7\,c)$$

The rotation angles $\theta$ and $\phi$ can be calculated by measuring gravity vector components on each axis of the accelerometer as;

$$\varphi = \tan^{-1}\left(\frac{g_y}{g_z}\right) \quad (8)$$

$$\theta = \tan^{-1}\left(\frac{g_x}{\sqrt{g_y^2 + g_z^2}}\right)$$

and $\psi$ is the heading of the vehicle that should be estimated.

Gravity Vector Estimation

For a chosen time interval, typically a few minutes, an estimate of the gravity component on each axis is obtained by averaging all the readings in this interval on that axis. However, the real time operation of the algorithm puts a constraint on the mentioned time interval. To limit the processing delay, we use a moving average with a variable window size. We start from the first sample and extend the averaging window size as time proceeds. In other word, the averaging window size is set to the sampling time, i.e. for the $n^{th}$ sample the averaging window size is chosen as n. It is obvious that, the gravity vector estimation is improved as more samples are collected. As at the start of trip a vehicle 14 may stay still for a while, the gravity estimations at the beginning of the trip may be valid in spite of having fewer samples. The following pseudo code implements the gravity estimation part.

```
if i == first Sample
    mgrav_x(i) = acc_x(i);
    mgrav_y(i) = acc_y(i);
    mgrav_z(i) = acc_z(i);
    ... ... ...
else
    mgrav_x(i) = (mgrav_x(i-1) * (i-1) + acc_x(i)) / i;
    mgrav_y(i) = (mgrav_y(i-1) * (i-1) + acc_y(i)) / i;
    mgrav_z(i) = (mgrav_z(i-1) * (i-1) + acc_z(i)) / i;
    ... ... ...
end
```

The accelerations and the gravity vector are normalized based on the gravity value of g (9.81 m/s$^2$). This normalization is done per sample as follows norm=sqrt(mgrav_*x(i)*^2+mgrav_*y(i)*^2+mgrav_*z(i)*^2);

scalefactor=norm/*g;* n_mgrav_*x(i)=*mgrav_*x(i)**scalefactor;

n_mgrav_*y(i)=*mgrav_*y(i)**scalefactor;

n_mgrav_*z(i)=*mgrav_*z(i)**scalefactor;

n_acc_*x(i)=*acc_*x(i)**scalefactor;

n_acc_*y(i)=*acc_*y(i)**scalefactor;

n_acc_*z(i)=*acc_*z(i)**scalefactor;

The vertical angles, $\phi$ and $\theta$, are then estimated based on (8) for each received sample and the vertical orientation is corrected by multiplying the normalized acceleration vector by rotation matrices and $R_\phi^x$ and $R_\theta^y$. This will transform the accelerometer coordinate into a new coordinate system aligning its z-axis with the z-axis of the vehicle (see FIG. 9).

Step Two: Horizontal Orientation Correction

Figure 9:
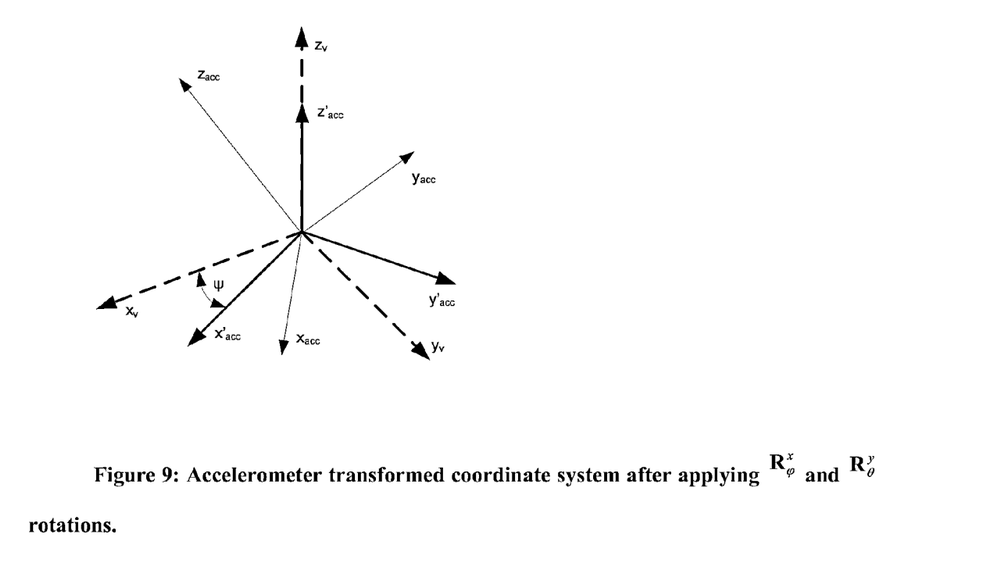
FIG. 9 illustrates an accelerometer transformed coordinate system after applying $R_\phi^x$ and $R_\theta^y$ rotations.

As shown in FIG. 9 in order to report the lateral and longitudinal accelerations in vehicle's coordinate system, the x-axis of the transformed accelerations ($x'_{Acc}$) should be aligned with the vehicle's forward direction ($x_v$). To this end the angle $\psi$ (heading) should be estimated.

Heading Estimation

To estimate $\psi$ we use the fact that when the vehicle 14 accelerates in a straight direction (without any turn or lane change) the resultant of the x and y components of the accelerometer coincides with the forward direction (heading) of the vehicle 14. This fact is utilized to estimate and compensate $\psi$.

The algorithm in step two works as follows: the angle between the resultant of the x and y components of the accelerometer 12 and the x component is monitored during the trip for the time intervals when the vehicle 14 is accelerating. If this angle is almost constant (The angle with fluctuations of less than around ±0.017 rad (±1 degrees) is considered as an almost constant angle by the algorithm) for a preset period of time, then it is concluded that during this time interval the vehicle 14 has accelerated in a forward direction without any turn. The value of this angle is used as an estimate of $\psi$. The horizontal rotation matrix is then obtained from (7c) and the final coordinate transformation is applied to align the forward direction of the vehicle 14 with that of the accelerometer 12.

If there were no noise, it would have been enough to estimate the angle $\psi$ once and apply it for the rest of the trips. However, the accelerometer 12 noise and the noise due to road roughness cause a noisy estimate of $\psi$, which in some cases may result in a false orientation correction. To alleviate this issue, the heading angle $\psi$ is estimated continuously when the horizontal acceleration magnitude exceeds a preset threshold. This improves the accuracy by avoiding the erroneous estimation during the time intervals when the vehicle is not moving (e.g., behind traffic lights). Then, this estimation is used as a legitimate estimation if it meets an accuracy criterion. More on this will be explained later.

Resolving Heading Estimation Ambiguity

As explained, the heading estimation is based on constant angle between x and y components of the horizontal acceleration, during the time intervals when the vehicle is accelerating in a straight direction. Similar to accelerating, the heading angle is also constant during decelerating (braking) in a straight direction which may cause a 180 degrees ambiguity in the heading estimation.

To resolve the heading estimation ambiguity, the speed of the vehicle, reported by either OBDII or GPS, should be used to differentiate between accelerating and decelerating. If the heading is estimated during a decelerating period the heading angle should be increased by 180 degrees. (The decelerating is recognized by checking the derivative of the speed. The vehicle is decelerating when the derivative of the speed is negative.) This resolves the heading estimation ambiguity.

Interpolating Speed Data

Usually, the accelerometer 12 sampling rate is much higher than the speed sampling rate. For example, the accelerometer 12 sampling rate may be set to 25 Hz while the speed is reported every second (1 Hz) by GPS 20. Hence, it is required to increase the speed data rate to that of the accelerometer 12. This is done by linear interpolating of the speed data. The following pseudo code shows the interpolating of the speed data (see FIG. 10) to increase its rate from 1 Hz to 25 Hz, as an example. The derivative of the interpolated speed is also derived in this process.

Figure 10:
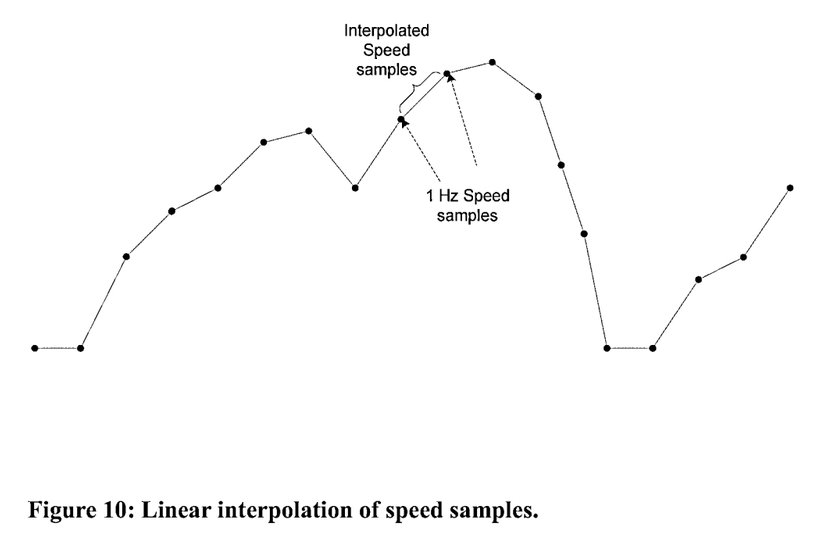
FIG. 10 illustrates linear interpolation of speed samples.

```
if i == first Sample
    for j = 1 : 25
        speed25(j) = speed(i);
        d_speed25(j) = 0;
    ... ... ...
else
    speed25(j+25*(i-1)) = speed(i-1) + j * (speed(i) - speed(i-1) )/ 25 ;
    d_speed25(j+25*(i-1)) = (speed25(j+25*(i-1)) -
    speed25(j-1+25*(i-1))) * 25;
    ... ... ...
end
```

1.1.1 Noise Reduction

The accelerometer 12 noise has an effect on the heading angle estimation. To reduce this effect the vertically re-oriented acceleration samples are filtered by a median filter with window size of med_fil_size. Showing the vertically re-oriented acceleration samples by hx, hy and hz, the filtering process can be performed with the following pseudo code,

```
% --- Initialization
for i = 1: med_fil_size
    avacc_x(i) = 0;
    avacc_y(i) = 0;
    avacc_z(i) = 0;
end
for jth sample
    for k = 1 : med_filt_size −1
        avacc_x(med_filt_size − k −1) = avacc_x(med_filt_size −
        k);
        avacc_y(med_filt_size − k −1) = avacc_y(med_filt_size −
        k);
        avacc_z(med_filt_size − k −1) = avacc_z(med_filt_size −
        k);
    end
    avacc_x(1) = vacc_x(j);
    avacc_y(1) = vacc_y(j);
    avacc_z(1) = vacc_z(j);
    mf_ vacc_x (j) = median(avacc_x);
    mf_ vacc_ y(j) = median(avacc_y);
    mf_ vacc_ z(j) = median(avacc_z);
    ... ... ...
``` where mf_avacc_x, mf_avacc_y and mf_avacc_z are filtered accelerations and median(.) is a function that finds the median of its input vector.

GPS Speed Data Loss

Due to the GPS 20 outage we may lose speed data for a while during the heading angle estimation process. As the speed is used to resolve the estimation ambiguity, the estimation process should be performed only when the GPS data is valid. A flag is set to indicate the presence of the valid GPS data. The algorithm continuously checks this flag for the valid speed data. The estimation is stopped when there is no GPS data.

Checking the Estimation Accuracy

In order to reject the erroneous estimated values, the accuracy of the estimated heading angle is checked when a new estimation is indicated. If the estimation is correct, the horizontally re-oriented longitudinal acceleration should match with the derivative of the speed data. This matching can be checked by correlating a number (corr_win_size) of past horizontally re-orientated longitudinal acceleration samples with the corresponding speed derivative samples. If this correlation is more than a threshold, say corr_threshold, then the estimated angle is accepted as a legitimate one.

1.1.2 Initial Heading Setting

The delay for estimating the horizontal heading angle is more than the vertical ones. The vertical angles usually are estimated accurately at the beginning of the trip after a few samples. However, as the heading is estimated when some conditions are met, it may take some times to get the first legitimate heading estimation. In order to reduce this delay, we may use an initial heading value based on past trips stored in CPU 16 memory. If the accelerometer 12 orientation is not modified during subsequent trips, the same orientation angles can be used for all trips.

To use the previous trip heading estimation as the initial heading value for the current trip, the gravity vector components of the previous trip are compared by the CPU 16 with those of the current one after a few seconds that the trip starts. If these components almost match then the final heading estimation of the previous trip is used as the initial heading angle value for the current trip.

Algorithm: Implementation Details

Figure 11:
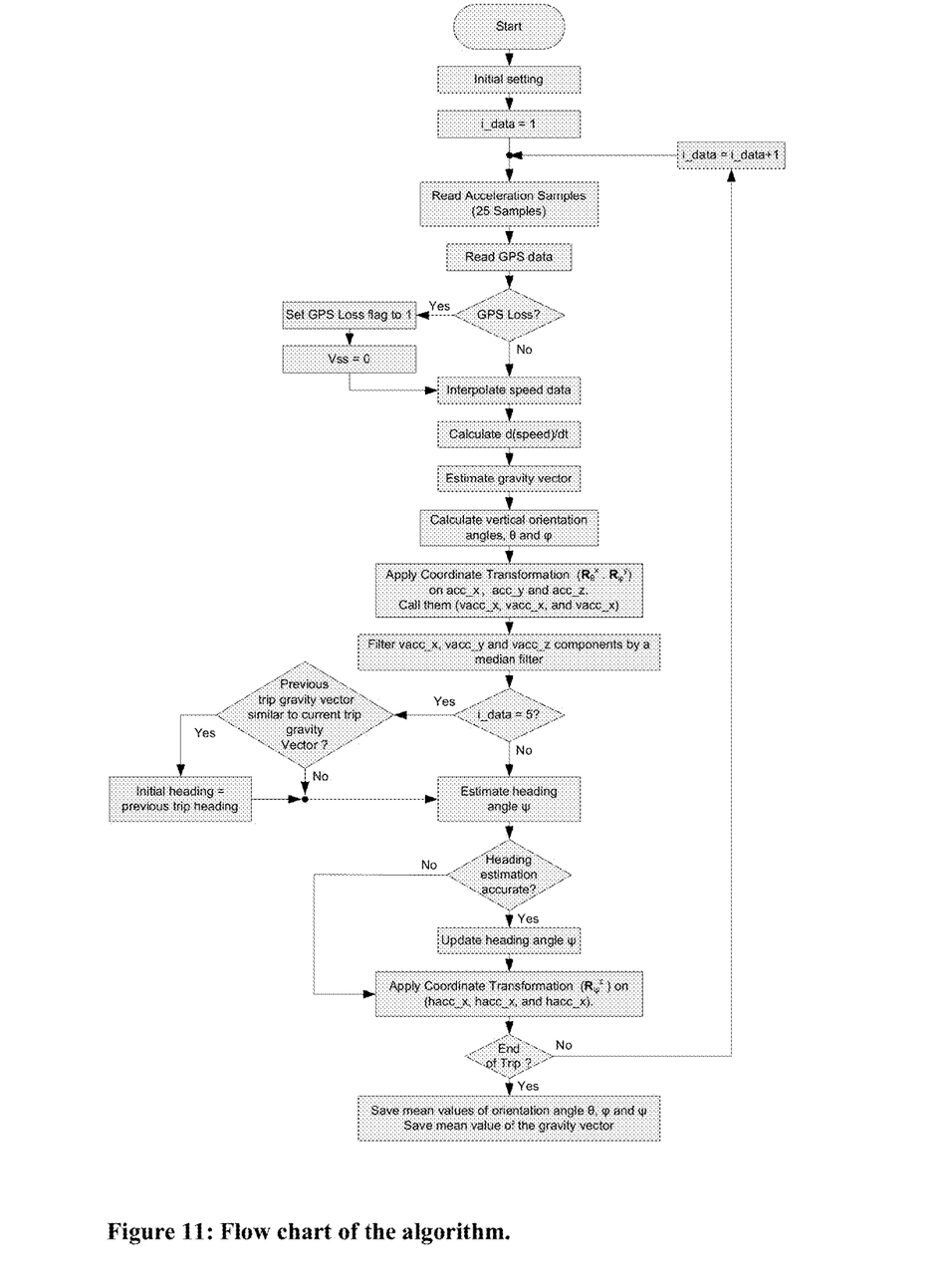
FIG. 11 is a first part of a flow chart of the algorithm.
Figure 12:
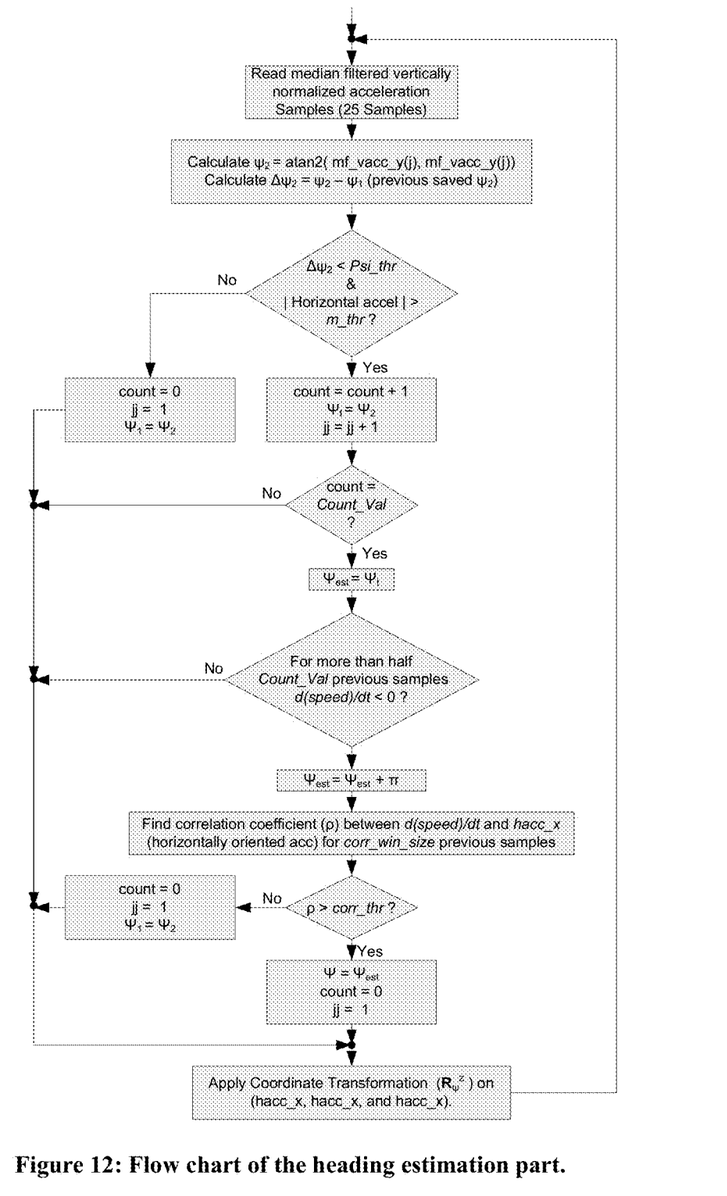
FIG. 12 is a continuation of the flow chart of FIG. 11, showing the heading estimation steps.

A general flow chart of the accelerometer orientation correction algorithm and the flow chart of the heading estimation process are shown in FIG. 11 and FIG. 12. It is assumed that the sampling rates of accelerometer and GPS data are 25 Hz and 1 Hz, respectively. In the following, algorithm steps are described in more details.

Parameter Setting

The following sets of parameters are initially set.

Fixed Parameters g=9.81; % gravity (m/s2)

Threshold Values

These values are preset and can be modified.

psi_thr=0.017; % Threshold for horizontal orientation (heading) estimation (rad)

m_thr=1; % acceleration magnitude threshold for horizontal orientation (heading) estimation (m/s$^2$)

Count_Val=5; % Counter value for horizontal orientation (heading) estimation med_fil_size=11; % Median Filter Size (should be less than 25)

corr_win_size=5000; % correlation window size for checking the accuracy of heading estimation corr_thr=0.6; % threshold on correlation coefficient for checking the accuracy of heading estimation In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A method for orienting an accelerometer in a vehicle including the steps of:
   a) determining a gravity vector relative to an accelerometer orientation by averaging accelerometer information from each of three axes of the accelerometer over time while the vehicle is moving;
   b) reorienting the accelerometer information based upon the gravity vector determined in said step a); and
   c) filtering the reoriented accelerometer information from said step b); and
   d) determining a forward direction of the vehicle to determine a horizontal orientation of the accelerometer relative to the vehicle, including applying principal component analysis to the filtered reoriented accelerometer information recorded by the accelerometer during a trip.

2. The method of claim 1 wherein said step d) is based upon a determination that change in direction of acceleration in a plane orthogonal to the gravity vector is below a threshold.

3. The method of claim 1 wherein said step d) is based upon a determination that the vehicle is traveling forward based upon speed information from the vehicle.

4. The method of claim 1 further including: using a previous determination of horizontal orientation from a previous trip as an initial accelerometer orientation relative to the vehicle.

5. The method of claim 1 further including the step of calculating a moving average with a variable time window size of a gravity component on each of the three axes.

6. The method of claim 2 wherein said step d) is performed without reference to information other than acceleration information from the accelerometer.

7. The method of claim 1 wherein said step d) further includes the step of expurgating the accelerometer information after said step a).

8. The method of claim 7 wherein said step of expurgating includes the step of monitoring an angle between the forward and lateral components of the accelerometer information during the trip.

9. The method of claim 8 further including the step of determining that a resultant of forward and lateral components of the accelerometer information coincides with the forward direction of the vehicle.

10. The method of claim 1 wherein said step d) is performed after determining that a change in a heading of the vehicle does not exceed a threshold.

11. The method of claim 1 wherein said step c) includes the step of applying a median filter to the reoriented accelerometer information from said step b).

* * * * *